United States Patent
Chin et al.

(10) Patent No.: US 9,794,978 B2
(45) Date of Patent: Oct. 17, 2017

(54) APPARATUS AND METHOD FOR CONFIGURING RADIO RESOURCES IN SLEEP MODE

(75) Inventors: Tom Chin, San Diego, CA (US);
Guangming Shi, San Diego, CA (US);
Kuo-Chun Lee, San Diego, CA (US);
Steven D Cheng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 13/353,212

(22) Filed: Jan. 18, 2012

(65) Prior Publication Data
US 2013/0077545 A1    Mar. 28, 2013

Related U.S. Application Data

(60) Provisional application No. 61/539,672, filed on Sep. 27, 2011.

(51) Int. Cl.
*H04W 72/04*    (2009.01)
*H04W 52/02*    (2009.01)
(Continued)

(52) U.S. Cl.
CPC ........ *H04W 76/048* (2013.01); *H04B 7/0413* (2013.01); *H04W 52/0216* (2013.01);
(Continued)

(58) Field of Classification Search
CPC ... H04W 72/04; H04W 52/02; H04W 76/048; H04W 52/0216; H04W 52/0219; H04B 7/0413
(Continued)

(56) References Cited

U.S. PATENT DOCUMENTS 7,623,861 B2    11/2009 Joshi et al.
7,826,459 B2    11/2010 Xhafa et al.
(Continued)

FOREIGN PATENT DOCUMENTS

KR    20070089516 A    8/2007
KR    20080003694 A    1/2008
(Continued)

OTHER PUBLICATIONS

International Search Report and Written Opinion—PCT/US2012/057256—ISA/EPO—Jan. 28, 2013.
(Continued)

*Primary Examiner* — Andrew Chriss
*Assistant Examiner* — Ellen Kirillova

(57) ABSTRACT

Methods and apparatuses are provided for configuring resources at a device operating in a sleep mode of a wireless network. The device can use at least some of the resources for other purposes, such as scanning neighbor base stations, acquiring system parameters of the wireless network or other networks, etc., based in part on requirements of a current interval of the sleep mode. In an available interval, a serving base station may attempt to communicate with the device, and thus, the device can keep at least one receiver chain tuned to the serving base station while assigning other resources to communicate with other base stations. In an unavailable interval, the device can assign all resources for communicating with the other base stations.

33 Claims, 12 Drawing Sheets

(51) Int. Cl.
*H04W 76/04* (2009.01)
*H04B 7/0413* (2017.01)
*H04W 36/00* (2009.01)
*H04W 76/02* (2009.01)
*H04W 88/06* (2009.01)

(52) U.S. Cl.
CPC .... *H04W 52/0219* (2013.01); *H04W 36/0066* (2013.01); *H04W 36/0088* (2013.01); *H04W 76/025* (2013.01); *H04W 88/06* (2013.01); *Y02B 60/50* (2013.01)

(58) Field of Classification Search
USPC .......................................................... 370/311
See application file for complete search history.

(56) References Cited

U.S. PATENT DOCUMENTS

| | | | |
|---|---|---|---|
| 2006/0120395 A1* | 6/2006 | Xing | H04B 7/0613 370/431 |
| 2007/0120679 A1* | 5/2007 | Shin | G06K 7/0008 340/572.7 |
| 2007/0135162 A1 | 6/2007 | Banerjea et al. | |
| 2007/0218939 A1* | 9/2007 | Lim et al. | 455/528 |
| 2008/0080446 A1 | 4/2008 | Chung | |
| 2008/0181173 A1* | 7/2008 | Wei | 370/329 |
| 2008/0220807 A1* | 9/2008 | Patel et al. | 455/524 |
| 2010/0111214 A1 | 5/2010 | Chin et al. | |
| 2010/0150101 A1* | 6/2010 | Ahluwalia et al. | 370/330 |
| 2010/0246476 A1* | 9/2010 | Hethuin | H04W 16/28 370/315 |
| 2010/0246548 A1* | 9/2010 | Bahng | H04B 7/0452 370/338 |
| 2010/0271998 A1* | 10/2010 | Jin et al. | 370/311 |
| 2011/0045763 A1* | 2/2011 | Mohanty et al. | 455/7 |
| 2011/0105112 A1 | 5/2011 | Cave et al. | |
| 2011/0211447 A1* | 9/2011 | Wang et al. | 370/230 |
| 2011/0244792 A1 | 10/2011 | Park et al. | |
| 2012/0027108 A1* | 2/2012 | Hong et al. | 375/260 |
| 2012/0320837 A1* | 12/2012 | Kim et al. | 370/329 |
| 2013/0115966 A1* | 5/2013 | Kang et al. | 455/450 |
| 2013/0121303 A1* | 5/2013 | Cho et al. | 370/329 |

FOREIGN PATENT DOCUMENTS

| | | |
|---|---|---|
| WO | WO-2004054142 | 6/2004 |
| WO | WO-2010091270 A1 | 8/2010 |
| WO | WO-2011002820 A1 | 1/2011 |
| WO | WO2011104140 A1 | 9/2011 |

OTHER PUBLICATIONS

Wikipedia, "Code division multiple access," (http://en.wikipedia.org/wiki/Code_division_multiple_access), Jun. 22, 2015.
Wikipedia, "Time division multiple access," (http://en.wikipedia.org/wiki/Time_division_multiple_access), Jun. 22, 2015.
Wikipedia, "Frequency-division multiple access," (http://en.wikipedia.org/wiki/Frequency-division_multiple_access), Jun. 22, 2015.
Wikipedia, "Orthogonal frequency-division multiplexing," (http://en.wikipedia.org/wiki/Orthogonal_frequency-division_multiplexing), Jun. 22, 2015.
Wikipedia, "Orthogonal frequency-division multiple access," (http://en.wikipedia.org/wiki/Orthogonal_frequency-division_multiple_access), Jun. 22, 2015.
Wikipedia, "W-CDMA (UMTS)," (http://en.wikipedia.org/wiki/W-CDMA_(UMTS)), Jun. 22, 2015.
3GPP, "3GPP Specification series," (http://www.3gpp.org/DynaReport/25-series.htm), Jun. 22, 2015.
3GPP, "3GPP Specification series," (http://www.3gpp.org/DynaReport/36-series.htm), Jun. 22, 2015.
IEEE, "IEEE 802.11: Wireless LANs," (http://standards.ieee.org/about/get/802/802.11.html), Jun. 22, 2015.
IEEE, "IEEE 802.16: Broadband Wireless Metropolitan Area Networks (MANs)," (http://standards.ieee.org/about/get/802/802.16.html), Jun. 22, 2015.
IEEE, "IEEE 802.20: Mobile Broadband Wireless Access (MBWA)," (http://standards.ieee.org/about/get/802/802.20.html), Jun. 22, 2015.
Wikipedia, "Orthogonal frequency-division multiplexing: FLASH-OFDM," (http://en.wikipedia.org/wiki/Orthogonal_frequency-division_multiplexing#FLASH-OFDM), Jun. 22, 2015.
3GPP2, "3GPP2 Cross Reference of Specifications," (http://www.3gpp2.org/Public_html/specs/speclist.cfm), Jun. 22, 2015.
IEEE, "IEEE 802: Overview & Architecture," (http://standards.ieee.org/about/get/802/802.html), Jun. 22, 2015.
Bluetooth Special Interest Group, "Specification Adopted Documents," (https://www.bluetooth.org/en-us/specification/adopted-specifications), Jun. 22, 2015.

* cited by examiner

APPARATUS AND METHOD FOR CONFIGURING RADIO RESOURCES IN SLEEP MODE

CLAIM OF PRIORITY UNDER 35 U.S.C. §119

The present application for patent claims priority to Provisional Application No. 61/539,672, entitled "APPARATUS AND METHOD FOR CONFIGURING RADIO RESOURCES IN SLEEP MODE," filed Sep. 27, 2011, assigned to the assignee hereof and hereby expressly incorporated by reference herein.

BACKGROUND

Field

The following description relates generally to wireless network communications, and more particularly to enhancing utilization of radio resources.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as Worldwide Interoperability for Microwave Access (WiMAX, IEEE 802.16), third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

In an example, a communication system can have a defined sleep mode during which a mobile or other wireless device can retain a connection with a base station without requiring constant communications therewith. For example, the base station can indicate one or more parameters related to a sleep mode to the device, during which the device can terminate communication resources to conserve power for a preconfigured or otherwise specified period of time. In one specific implementation, WiMAX systems support available and unavailable intervals within a sleep mode. For example, during the unavailable interval, the base station does not communicate with the device, whereas in the available interval, the base station may communicate an indication for the device to exit the sleep mode to receive communications from the base station. The start, end, duration, etc. of the unavailable and available intervals within the sleep mode can be predefined or configured, signaled to the device, and/or the like, such that the device and base station use the same periods of time as the unavailable and available intervals.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with configuring resources at a device operating in a sleep mode of a wireless network. For example, depending on requirements of the sleep mode, the device may not need all resources tuned to the wireless network since the device likely does not receive signals from the wireless network during a time period associated with the sleep mode. Thus, the device can use at least some of the resources for other purposes, such as scanning neighbor base stations, acquiring system parameters of the wireless network or other networks, etc. Moreover, within the sleep mode, intervals can be defined having various requirements regarding communication within the intervals. Resources can further be configured within the intervals based on such requirements and/or one or more parameters related to the intervals.

According to an example, a method is provided for determining multiple-input multiple-output (MIMO) resource allocation. The method includes determining a type of a current interval for communicating with a serving base station during a sleep mode. The method also includes assigning MIMO resources between the serving base station and at least one neighbor base station based at least in part on the type of the current interval.

In another aspect, an apparatus for determining MIMO resource allocation is provided. The apparatus includes at least one processor configured to determine a type of a current interval for communicating with a serving base station during a sleep mode and assign MIMO resources between the serving base station and at least one neighbor base station based at least in part on the type of the current interval. The apparatus also includes a memory coupled to the at least one processor.

In yet another aspect, an apparatus for determining MIMO resource allocation is provided including means for determining a type of a current interval for communicating with a serving base station during a sleep mode. The apparatus also includes means for assigning MIMO resources between the serving base station and at least one neighbor base station based at least in part on the type of the current interval.

Still, in another aspect, a computer-program product for determining MIMO resource allocation is provided including a non-transitory computer-readable medium having code for causing at least one computer to determine a type of a current interval for communicating with a serving base station during a sleep mode. The computer-readable medium further includes code for causing the at least one computer to assign MIMO resources between the serving base station and at least one neighbor base station based at least in part on the type of the current interval.

Moreover, in an aspect, an apparatus for determining MIMO resource allocation is provided that includes an interval determining component for determining a type of a current interval for communicating with a serving base station during a sleep mode. The apparatus further includes a MIMO resource allocating component for assigning MIMO resources between the serving base station and at least one neighbor base station based at least in part on the type of the current interval.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
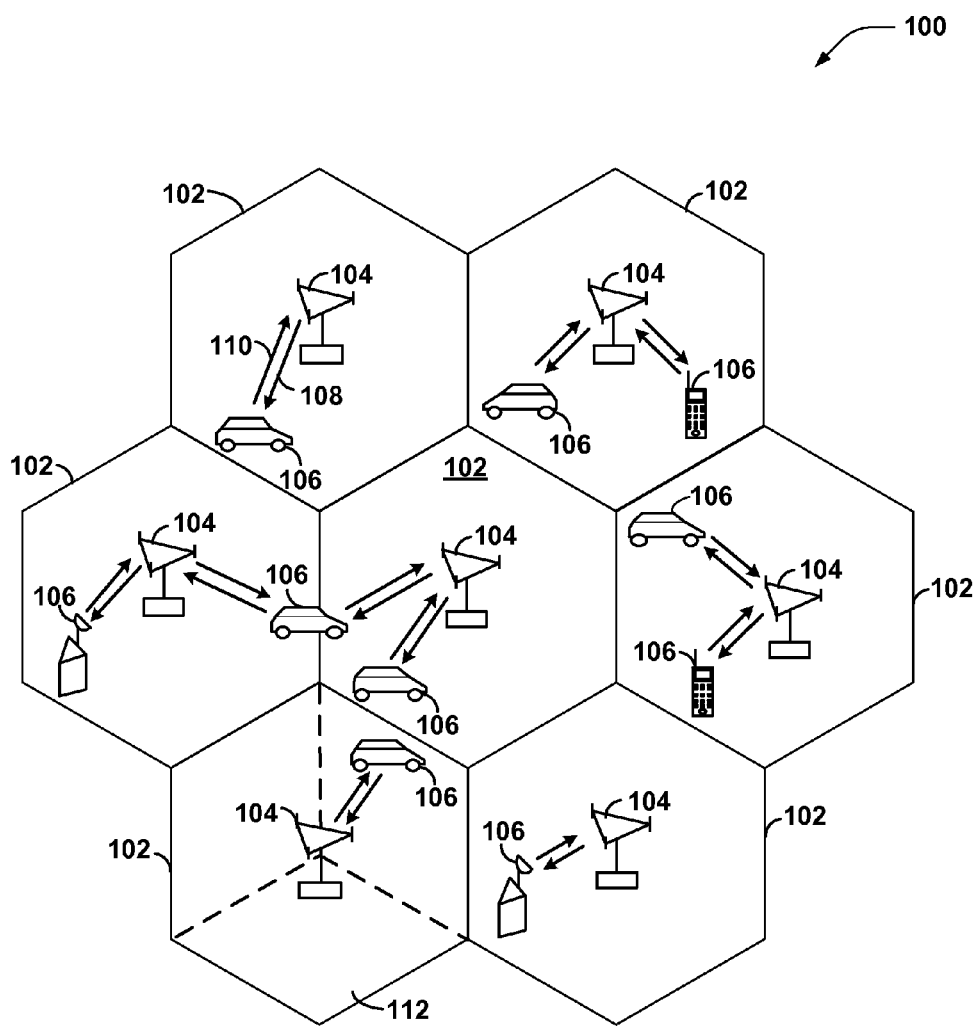
FIG. 1 illustrates an example wireless communication system in accordance with certain embodiments described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to configuring resources of a device operating in a sleep mode. For example, the device may not require all resources during the sleep mode since the device likely does not receive communications during the sleep mode (e.g., or at least first receives an indication to expect communications in the sleep mode). In this regard, for example, the device can allocate at least a portion of the resources to perform other operations during a time period of the sleep mode, such as scanning neighboring base station signals, acquiring system parameters related to a serving base station, accessing a network related to the serving or neighboring base stations, etc. In one example, however, the device can retain at least some resources for communicating with the serving base station based on one or more requirements of the sleep mode and/or an interval of the sleep mode (e.g., to receive an indication of communication from the serving base station, to receive a command to exit sleep mode, etc.).

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a BS 104. A BS 104 may be a fixed station that communicates with user terminals 106. The BS 104 may alternatively be referred to as an access point, a Node B, eNB, or some other terminology.

FIG. 1 depicts various user terminals 106 dispersed throughout the system 100. The user terminals 106 may be fixed (e.g., stationary) or mobile. The user terminals 106 may alternatively be referred to as remote stations, access terminals, terminals, subscriber units, mobile stations, stations, user equipment (UE), etc. The user terminals 106 may be wireless devices, such as cellular phones, personal digital assistants (PDAs), handheld devices, wireless modems, laptop computers, personal computers, a portion thereof, etc.

A variety of algorithms and methods may be used for transmissions in the wireless communication system 100 between the BSs 104 and the user terminals 106. For example, signals may be sent and received between the BSs 104 and the user terminals 106 in accordance with OFDM/OFDMA techniques. If this is the case, the wireless communication system 100 may be referred to as an OFDM/OFDMA system.

A communication link that facilitates transmission from a BS 104 to a user terminal 106 may be referred to as a downlink 108, and a communication link that facilitates transmission from a user terminal 106 to a BS 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. BSs 104 within a wireless communication system 100 may utilize antennas that concentrate the flow of power within a particular sector 112 of the cell 102. Such antennas may be referred to as directional antennas.

Figure 2:
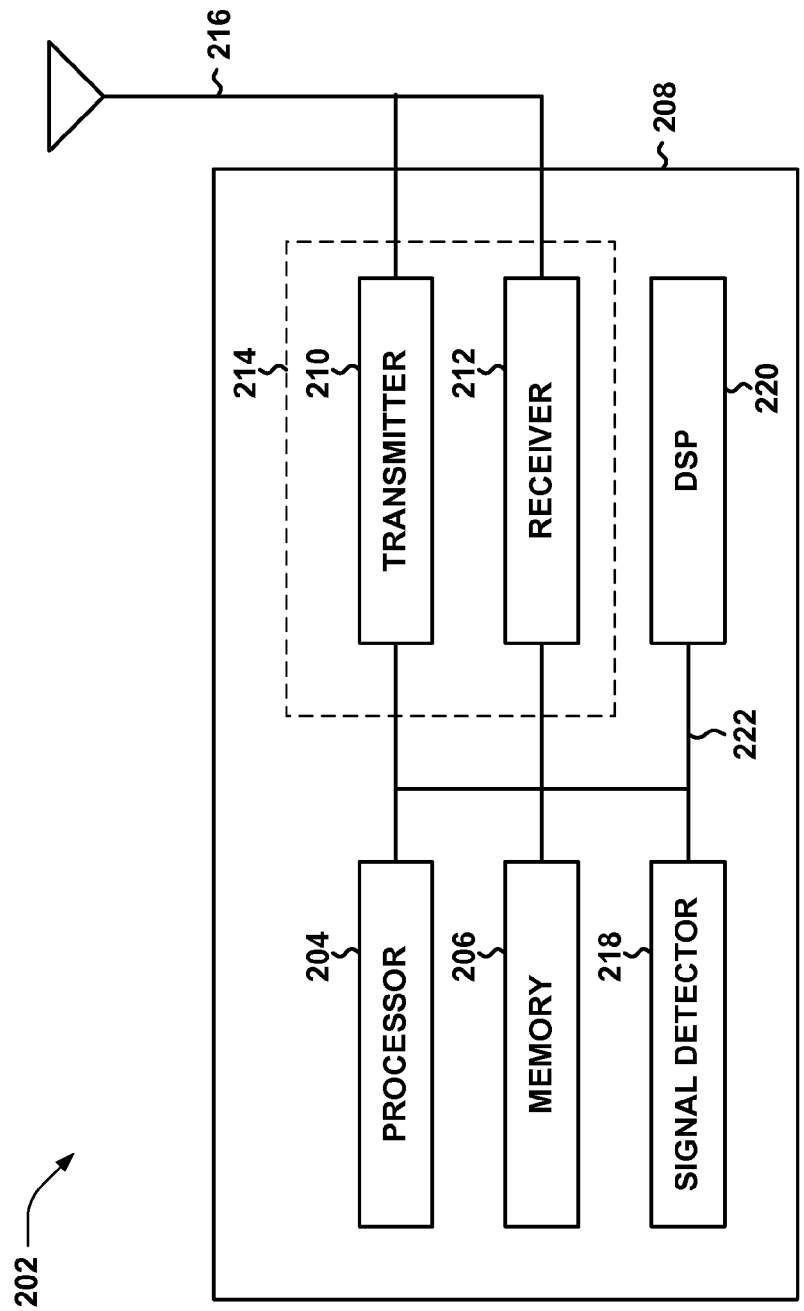
FIG. 2 illustrates various components that can be utilized in a wireless device in accordance with certain embodiments described herein.

FIG. 2 illustrates various components that may be utilized in a wireless device 202 that may be employed within the wireless communication system 100. The wireless device 202 is an example of a device that may be configured to implement the various methods described herein. The wireless device 202 may be a BS 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas to facilitate MIMO communications.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
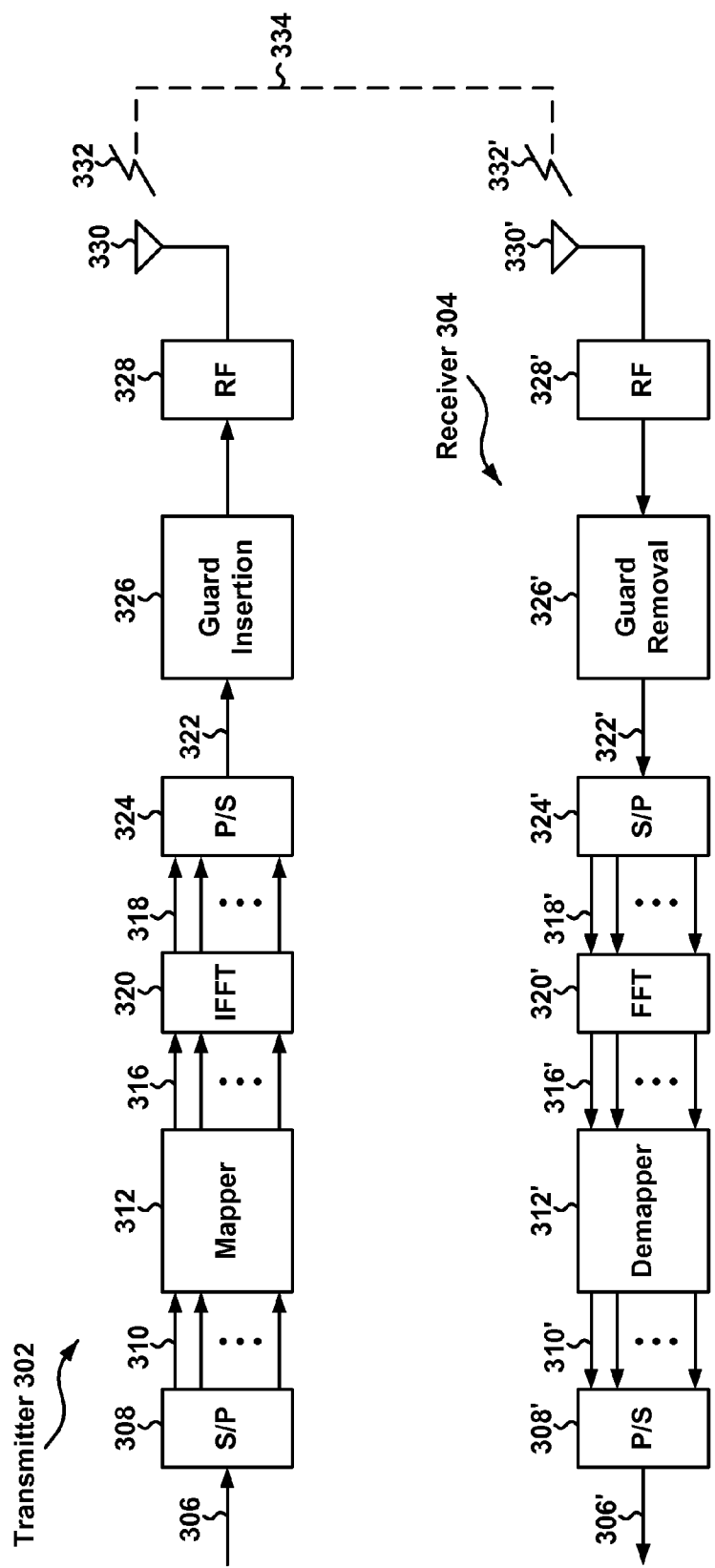
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments described herein.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a BS 104 for transmitting data 306 to a user terminal 106 on a downlink 108. The transmitter 302 may also be implemented in a user terminal 106 for transmitting data 306 to a BS 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a BS 104 on a downlink 108. The receiver 304 may also be implemented in a BS 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor.

Figure 4:
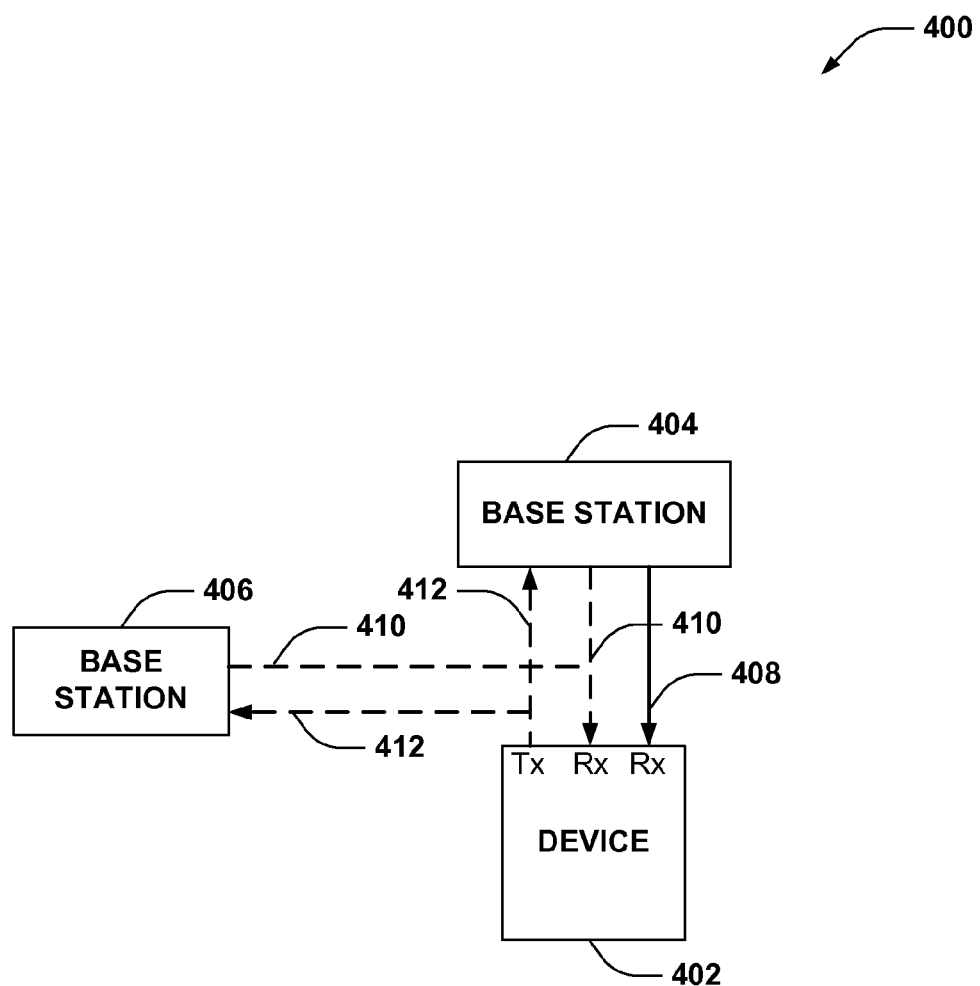
FIG. 4 illustrates a block diagram of an example system for communicating with multiple base stations over multiple-input multiple-output (MIMO) resources.

FIG. 4 illustrates a wireless communication system 400 that facilitates allocating MIMO resources during different intervals within a sleep mode. System 400 can include a device 402 that communicates with one or more base stations 404 and/or 406 to receive wireless network access. Device 402 can be a UE, modem (or other tethered device), a portion thereof, and/or the like, and can include user terminal 106, wireless device 202, etc. Moreover, base stations 404 and 406 can each be a macro base station, femto node, pico node, relay, mobile base station, device (e.g., communicating in peer-to-peer or ad-hoc mode with device 402), a portion thereof, and/or the like, and can include base station 104, wireless device 202, etc.

For example, device 402 can communicate over MIMO resources to establish connections 408, 410, and 412 with base station 404 and/or 406. Thus at any given time, device 402 can receive communications over connection 408 from base station 404 while also receiving communications over connection 410 from base station 404 or 406 and transmitting communications over connection 412 to base station 404 or 406 in MIMO. In one example, the base stations 404 and 406 can be of different radio access technologies (RAT).

According to an example, device 402 can communicate with base station 404 using MIMO over multiple connections, including connection 408, which can be associated with a receiver chain, connection 410, which can be associated with another receiver chain, and connection 412, which can be associated with a transmitter chain at device 402. For example, the receiver and transmitter chains can correspond to virtual or physical antenna ports at device 402, which the device 402 can accordingly assign to one or more base stations and/or tune to related operating frequencies to receive signals therefrom and/or transmit signals thereto. In one example, the receiver chain and/or transmitter chains related to connections 408, 410, and 412 can correspond to transmitter 210 and/or receiver 212, and/or multiple instances thereof, within a transceiver 214 of wireless device 202.

In an example, device 402 can enter a sleep mode related to communicating with base station 404. For example, the device 402 can determine to enter the sleep mode based in part on a predefined or configured parameters to detect or otherwise initialize the sleep mode time period, a command received from the base station 404 to enter the sleep mode, a detected period of inactivity with base station 404, and/or the like. In any case, during at least a portion of the sleep mode, device 402 can utilize at least a portion of the MIMO resources for other purposes.

In one example, during the sleep mode, device 402 can utilize the receiver chain associated with connection 408 to continue to receive communications from base station 404 while assigning the receiver chain associated with connection 410 and the transmitter chain associated with connection 412 to communicate with base station 406. For example, device 402 can scan signals from base station 406, acquire system parameters therefrom (e.g., in downlink channel descriptor (DCD), system information blocks (SIB), etc., depending on wireless technology), perform network access with base station 406, and/or the like, over the receiver chain associated with connection 410 and/or the transmitter chain associated with connection 412. Once the sleep mode ends, for example, device 402 can reallocate MIMO resources to base station 404, and can thus switch the receiver chain associated with connection 410 and/or the transmitter chain associated with connection 412 back to base station 404.

In a specific example, base station 404 and device 402 can communicate in a sleep mode comprising one or more intervals, where each of the one or more intervals within the sleep mode can have varying definitions for communications between the device 402 and base station 404. For example, the sleep mode can include unavailable intervals where the base station 404 does not communicate with device 402, as well as one or more available intervals where base station 404 may transmit one or more indicators to device 402 related to subsequent communications. In this example, device 402 can configure MIMO resources between base station 404 and base station 406 based on one or more parameters regarding a given interval. Though described in terms of configuring resources between different base stations 404 and 406, it is to be appreciated that device 402 can configure resources between two RATs at the base stations 404 and 406 and/or at a single base station 404.

For example, during at least the available intervals, device 402 can configure the MIMO resources such to allow device 402 to receive signals from base station 404 (e.g., over the receiver chain associated with connection 408). In addition, device 402 can further configure the resources based on communications received in the available interval. For example, base station 404 can communicate an indicator relating to subsequent communications with base station 404 over the receiver chain associated with connection 408 during the available interval, which can cause device 402 to assign additional MIMO resources (e.g., the receiver chain associated with connection 410 and/or transmitter chain associated with connection 412) to base station 404 to attempt to receive the communications. It is to be appreciated that device 402 can allocate all MIMO resources to base station 406 during unavailable intervals. Moreover, the intervals and/or communication mode can be modified based on time, one or more events, and/or the like, and changing the interval and/or communication mode can accordingly cause a reconfiguration of at least some MIMO resources, for example.

Figure 5:
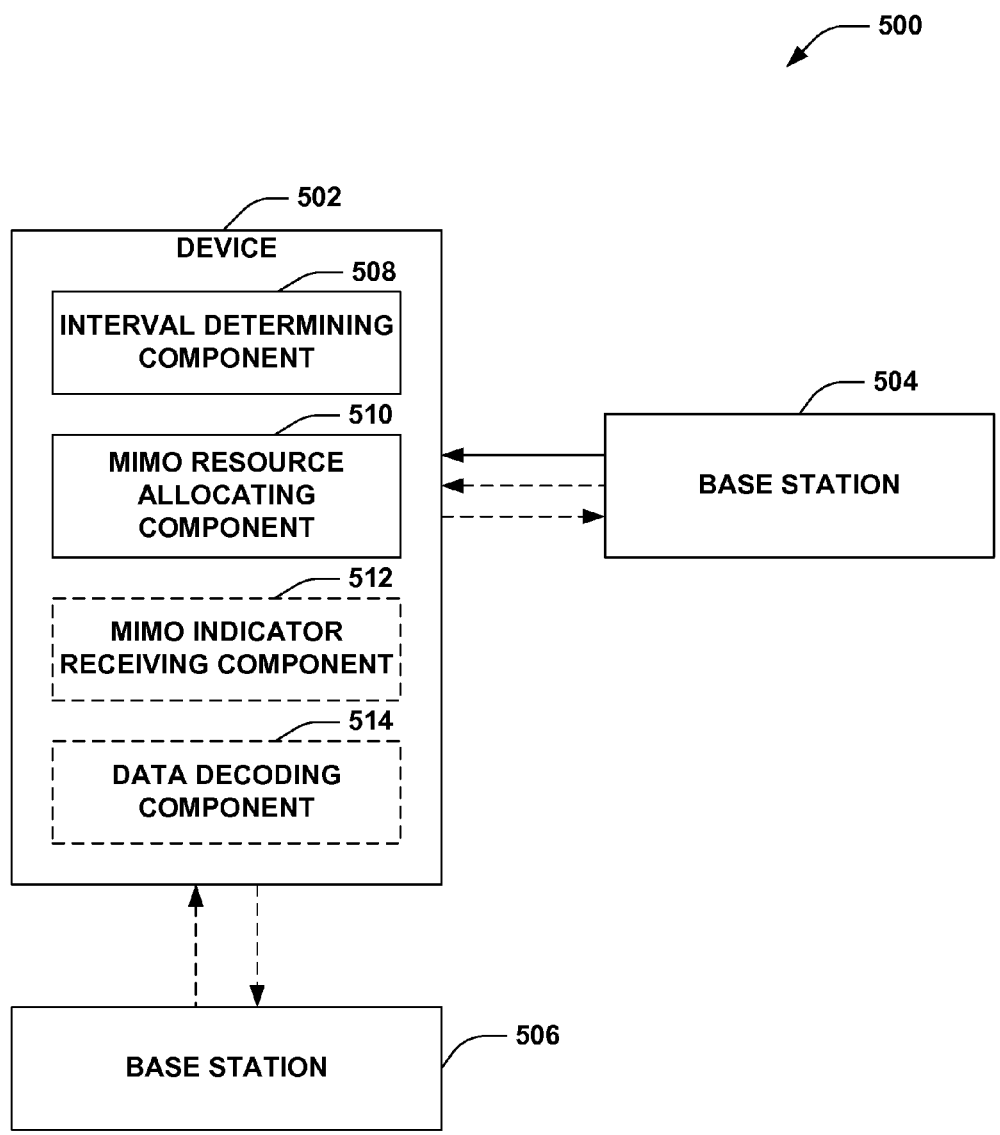
FIG. 5 illustrates a block diagram of an example system for allocating MIMO resources among multiple base stations.

FIG. 5 depicts an example wireless communication system 500 that facilitates reconfiguring MIMO resources during sleep mode communications with a base station. System 500 can include a device 502 that communicates with one or more base stations 504 and/or 506 using MIMO resources, as described. Device 502 can be a UE, modem, etc., similar to device 402, and base stations 504 and 506 can each be a macro base station, femto node, etc., similar to base stations 404 and 406.

Device 502 can comprise an interval determining component 508 for determining a current interval related to a communication mode with one or more base stations, and a MIMO resource allocating component 510 for configuring MIMO resources among one or more of a plurality of base stations in the current interval. Device 502 also includes an optional MIMO indicator receiving component 512 for obtaining an indication from the one or more base stations to communicate using MIMO in the current or a subsequent interval, and/or an optional data decoding component 514 for decoding data signals received from one or more base stations.

According to an example, device 502 and base station 504 can communicate over substantially all MIMO resources available at device 502 in an active communications mode. For example, this can include communicating over a plurality of physical or virtual antenna ports each related to receiving from or transmitting to base station 504. Base station 504 and device 502 can also communicate in a sleep mode, as described. During the sleep mode, device 502 can terminate at least some communication resources, which can include powering down antennas, for a corresponding period of time. For example, sleep mode time periods can be predefined and/or configured at device 502 and/or base station 504. In one example, base station 504 can specify one or more parameters regarding the sleep mode periods and/or from which the sleep mode periods can be derived. The interval determining component 508 can obtain the parameters and determine the sleep mode time period.

For example, a sleep mode duration can be predefined or preconfigured at device 502, while the base station 504 can signal the start of a first or one or more other sleep modes to device 502, such that interval determining component 508 can determine the end of the sleep mode, the beginning of a next sleep mode, and/or the like based on the signaling and predefined or preconfigured parameters. In another example, the base station 504 can signal an inactivity timer to device 502, which the interval determining component 508 can initialize after receiving one or more communications from the base station 504, and where the timer expires without receiving a subsequent communication from the base station 504, the interval determining component 508 can determine the start of a sleep mode for a predefined or otherwise configured or signaled duration. In one specific example— e.g., in WiMAX—base station 504 can transmit a MOB-_SLP-REQ to device 502 to indicate beginning of the sleep mode, and device 502 can communicate a MOB_SLP-RSP to confirm sleep mode.

Moreover, in some systems, such as WiMAX, various intervals are defined within the sleep mode, during which communications from the base station 504 depend on the corresponding interval and/or other parameters. MIMO resource allocating component 510 can assign MIMO resources to one or more base stations 504 and/or 506 based in part on determining a type of a current interval within a sleep mode. For example, in an unavailable interval, base station 504 does not transmit to device 502, and thus, MIMO resource allocating component 510 can power off MIMO resources and/or utilize the resources for other purposes. In an available interval, for example, base station 504 can signal an indication related to communications transmitted by base station 504 in a current time period (e.g., a subframe). In this example, MIMO resource allocating component 510 can utilize at least one receiver chain in the MIMO resources for listening to potential signals from base station 504 while assigning other MIMO resources for other purposes. In a specific example, the indication signaled from base station 504 in an available interval can be in the form of one or more of a unicast downlink data burst allocation in a current subframe, a traffic indicator, a local data demand from device 502, a ranging response, and/or other indications that can relate to impending data communications.

Moreover, for example, the sleep mode can generally correspond to discontinuous receive (DRX) in LTE. DRX can include a receiving mode, which can be similar to an available interval where the device 402 may receive a data burst or other communications from base station 404, and can thus configure at least one receiver chain thereto. DRX can also include a discontinued receiving mode, which can be similar to an unavailable interval where the device 402 need not configure resources for the base station 404. Thus, though generally described in terms of available and unavailable intervals of a sleep mode, it is to be appreciated that concepts described herein can be specifically applied to DRX and corresponding receiving and discontinued receiving modes of LTE as well. Thus, for example, where device 502 is communicating using DRX, interval determining component 508 can determine whether the device 502 is operating in a receiving or discontinued receiving mode, and MIMO resource allocating component 510 can accordingly allocate at least one receiver chain to the base station 504 in the former case, while allocating the at least one receiver chain for another purpose in the latter case.

In either example, resources that are not utilized to potentially communicate with base station 504 can be assigned for communicating with other base stations, such as base station 506. In this regard, interval determining component 508 can determine the type of the current interval in the sleep mode (e.g., whether base station 504 is communicating with device 502 in an available or unavailable interval). Where interval determining component 508 determines that the base station 504 is communicating with device 502 in an available type of interval, MIMO resource allocating component 510 can configure at least a portion of receiver chains (e.g. or related resources) to receive from base station 504, while MIMO resource allocating component 510 can assign a remaining portion of transmitter and/or receiver chains (e.g., or related resources) for communicating with base station 506. In this example, MIMO indicator receiving component 512 can obtain an indicator, over the at least a portion of receiver chains tuned to receive signals from base station 504, that specifies to use one or more additional MIMO resources in communicating with base station 504.

In a specific example, the MIMO resource allocating component 510 can configure the remaining portion of transmit and/or receiver chains for scanning signals from base station 506 or other base stations, acquiring system parameters therefrom (such as a DCD, uplink channel descriptor (UCD), NBR-ADV, etc., in WiMAX, a system parameter message in CDMA 1x, a sector parameter message in CDMA evolution data optimized (EVDO), system information in UMTS, etc.), accessing a wireless network through base station 506 (e.g., performing initial ranging, initial network entry in WiMAX, power up registration in CDMA 1x, unicast access terminal identifier (UATI) assignment and session configuration in CDMA EVDO, general packet radio service (GPRS) attach procedure in UMTS, etc.), and/or the like. With at least one receiver chain tuned to receive signals from base station 504 in the available interval, however, device 502 can receive one or more messages including downlink (DL)-map (MAP) or uplink (UL)-map (MAP) broadcast messages, DCD, UCD, TRF-IND broadcast message, etc., in WiMAX from base station 504.

For example, the message can be a DL-MAP indicating that base station 504 transmits a downlink data burst (e.g., a MAC protocol data unit (PDU) and/or the like) in a related subframe, a TRF-IND message that indicates device 502 should exit sleep mode, etc. In this example, upon MIMO indicator receiving component 512 obtaining the message, MIMO resource allocating component 510 can accordingly assign at least another portion of the MIMO resources to base station 504 to communicate therewith. This can include switching one or more receiver chains from base station 506 to base station 504 to provide additional MIMO resources. In the event that MIMO resource allocating component 510 cannot switch the one or more receiver chains in time to receive the downlink data, in this example, data decoding component 514 can still attempt to decode the data received over the original portion of receiver chains. Where base station 504 uses a coding scheme that allows for receiving communications over a portion of receiver chains, such as MIMO matrix A which uses space time coding, data decoding component 514 may be able to decode the communications over the single receiver chain.

In yet another example, MIMO resource allocating component 510 can determine whether periodic ranging is specified as part of determining configuration of the MIMO resources. In WiMAX, for example, ranging can be used to provide contention-based access where a device 502 transmits a ranging request to obtain contention-based resources from a base station 504. Thus, MIMO resource allocating component 510 can determine whether ranging is specified based in part on one or more parameters regarding an associated connection with the base station 504, which can be configured at device 502, signaled from base station 504, and/or the like. In this example, MIMO resource allocating component 510 can configure at least one transmitter chain to base station 504 for transmitting a ranging request (RNG-REQ) thereto, and/or at least one receiver chain for receiving a ranging response (RNG-RSP) in at least a portion of one or more intervals during sleep mode. For example, upon receiving the RNG-RSP, which can be received by MIMO indicator receiving component 512, in one example, MIMO resource allocating component 510 can reassign at least the transmitter chain to base station 506 since the RNG-REQ is successfully received at base station 504.

In another example, where interval determining component 508 determines that the base station 504 is communicating with device 502 in an unavailable type of interval, MIMO resource allocating component 510 can at least one of allocate substantially all MIMO resources for communicating with base station 506 or other purposes, terminate MIMO resources for the interval, and/or the like. In either case, interval determining component 508 can determine whether a type of the current interval is unavailable or available based in part on at least one of detecting expiration of a predefined or configured time period related to a previous interval, receiving an indication from the base station 504 to enter the interval, detecting another event that indicates entering one or more intervals, and/or the like. MIMO resource allocating component 510 can configure MIMO resources, as described, based on the determined interval.

In a specific example, where implemented for a WiMAX system, base station 504 can also communicate a traffic triggered wakening flag to device 502 indicating whether the device 502 can expect to receive signals from base station 504 during available intervals in sleep mode. For example, the base station 504 can use the traffic triggered wakening flag to specify whether it may transmit unicast communications to device 502 in a corresponding subframe, as described. Thus, if this flag is set to off, the device 502 need not retain receiver chains allocated to base station 504 during available intervals while communicating in sleep mode; rather, the concepts above can be applied when the flag is set to on, such that MIMO resource allocating component 510 can assign the MIMO resources upon receiving data (or an indication thereof) to be communicated using the MIMO resources.

Figure 6:
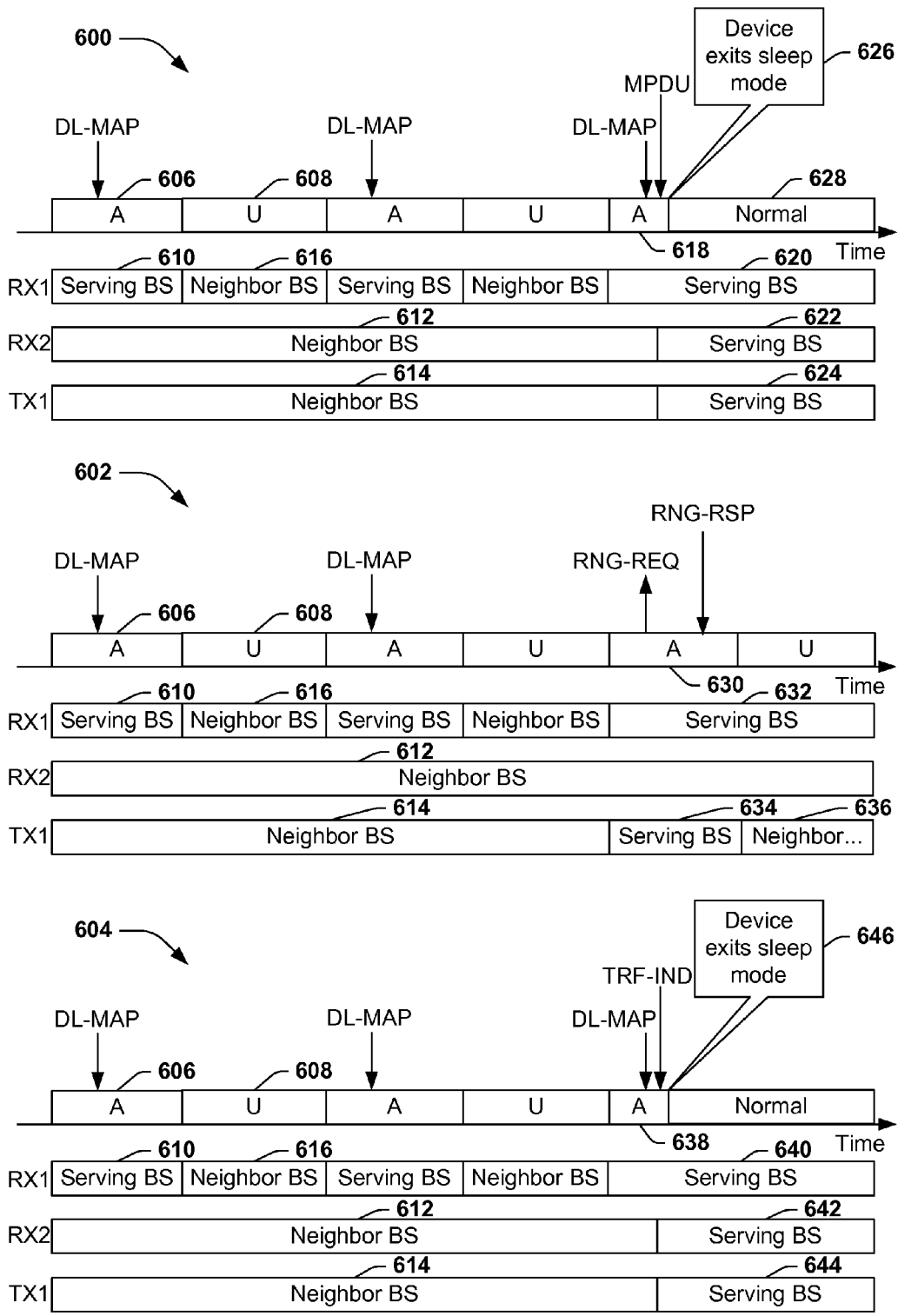
FIG. 6 illustrates example timelines for communicating with multiple base stations using MIMO resources.

FIG. 6 illustrates example timelines 600, 602, and 604 of alternating sleep mode intervals and respective MIMO resource allocations.

Timeline 600 shows alternating available intervals 606 and unavailable intervals 608, and associated resource allocations for MIMO resources of a device including receive chain 1 (RX1), receive chain 2 (RX2), and transmit chain 1

(TX1). During the available interval 606, RX1 is tuned to (e.g., configured for communicating with) a serving base station at 610, while RX2 and TX2 are tuned to one or more neighbor base stations at 612 and 614. During the available interval 606, a DL-MAP is received that does not indicate a downlink data burst in the available interval 606. During the unavailable interval 608, RX2 and TX1 remain tuned to neighbor base stations at 612 and 614, and RX1 is also tuned to the same or different neighbor base station at 616. Thus, all resources can be tuned away from the serving base station during unavailable intervals 608, while at least one receiver, RX1, is tuned to a serving base station in available intervals 606. For example, RX1 can be tuned to the serving base station where a traffic triggered wakening flag is set to on for communications therewith.

For available interval 618, in this example, RX1 is tuned to the serving base station at 620 to receive the DL-MAP, and the DL-MAP can indicate that an MPDU is to be transmitted from the serving base station in the available interval 618 (e.g., in a subframe over which the DL-MAP is received). In this example, the device can tune RX2 and TX1 to the serving base station at 622 and 624 to facilitate receiving the MPDU. In addition, the device can exit sleep mode at 626 to facilitate communicating with the serving base station using MIMO in a normal mode at 628.

In timeline 602, the device and base station can again communicate in sleep mode with alternating available intervals 606 and unavailable intervals 608. Similarly, as described, RX1 can be assigned to communicate with the serving base station at 610, while RX2 and TX1 are assigned to one or more neighbor base stations at 612 and 614. Moreover, RX1 can switch to communicate with the one or more neighbor base stations at 616. In this example, during available interval 630, RX1 can switch back to communicate with the serving base station at 632. Moreover, the device can determine to perform ranging with the serving base station for contention-based resources, as described above. Thus, TX1 can also be switched to communicate with the serving base station at 634, and can be used to transmit a RNG-REQ during the available interval. A RNG-RSP can be received from the serving base station, at which point TX1 can switch back to communicating with the neighbor base station at 636 since ranging is complete.

In timeline 604, the device and base station can again communicate in sleep mode with alternating available intervals 606 and unavailable intervals 608. Similarly, as described, RX1 can be assigned to communicate with the serving base station at 610, while RX2 and TX1 are assigned to one or more neighbor base stations at 612 and 614. Moreover, RX1 can switch to communicate with the one or more neighbor base stations at 616. In this example, during available interval 638, RX1 can switch back to communicate with the serving base station at 640. In addition, a TRF-IND can be received over RX1 during available interval 638, which can indicate to exit sleep mode. Thus, RX2 can be tuned to the serving base station at 642, as well as TX1 at 644, to facilitate communicating in normal mode, and the device can exit sleep mode at 646.

Figure 7:
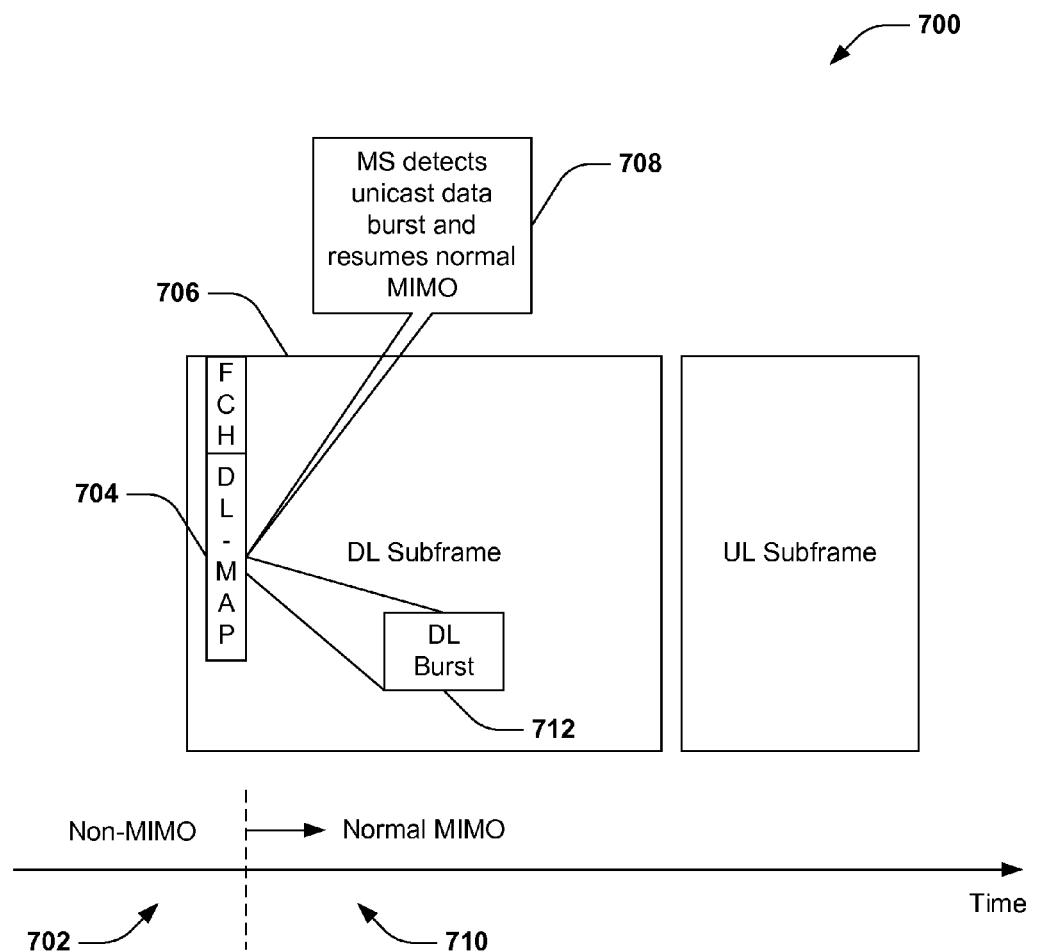
FIG. 7 illustrates an example timeline for communicating with a serving base station in non-MIMO and MIMO modes.

FIG. 7 illustrates an example time period 700 for determining a MIMO resource configuration for communicating with a serving base station. As described, a device can communicate with a serving base station in a sleep mode using at least one receive chain to receive signals therefrom. In this illustration, the device can communicate with the serving base station during the non-MIMO period 702 using the at least one receive chain. The device can utilize remaining MIMO resources for other purposes, as described, such as communicating with other base stations of other RATs, performing system access, obtaining system information, etc. In one example, the device can receive DL-MAP 704 from the serving base station over the at least one receive chain during sleep mode, which can indicate a data burst in the corresponding downlink subframe 706. In this example, the device can detect the unicast data and assign additional MIMO resources at 708 for communicating with the serving base station in normal MIMO mode 710 to receive downlink data burst 712 based on the DL-MAP 704 allocation. For example, this can include assigning substantially all MIMO resources for communicating with the serving base station and/or the like where the resources were previously assigned to communicating with other base stations or otherwise tuned away from the serving base station.

If the device cannot pullback the resources to receive downlink data burst 712 (e.g., tune the resources from other base stations to receive from the base station transmitted downlink data burst 712), the device can still attempt to receive the downlink data burst 712 over the at least one resource assigned to communicate with the serving base station, as described. Where a MIMO coding, such as MIMO matrix A or other space time coding, is used, the device may be able to decode the downlink data burst 712 based on receiving the burst over a portion of resources. In addition, in a specific example, the functionality can occur where a traffic triggered wakening flag for the sleep mode is set to on.

Figure 8:
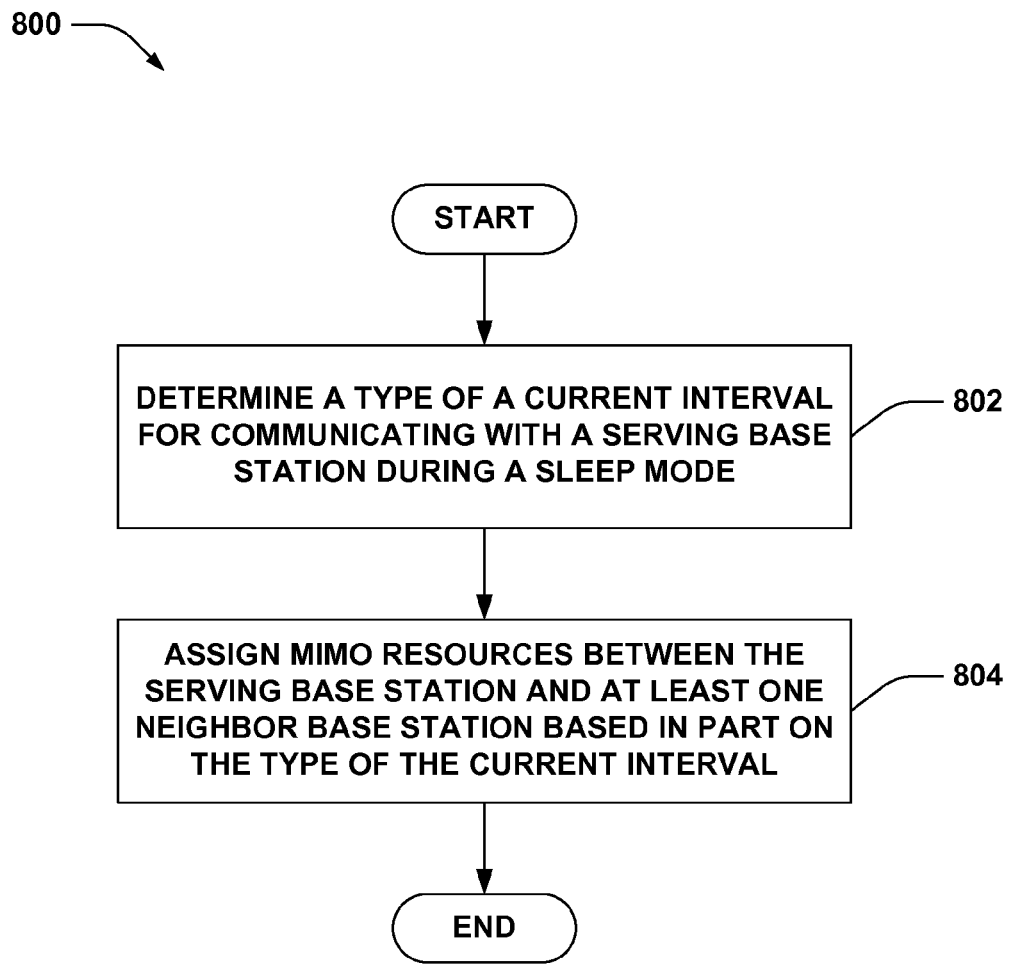
FIG. 8 is a flow chart of an aspect of a methodology for assigning MIMO resources among multiple base stations.
Figure 9:
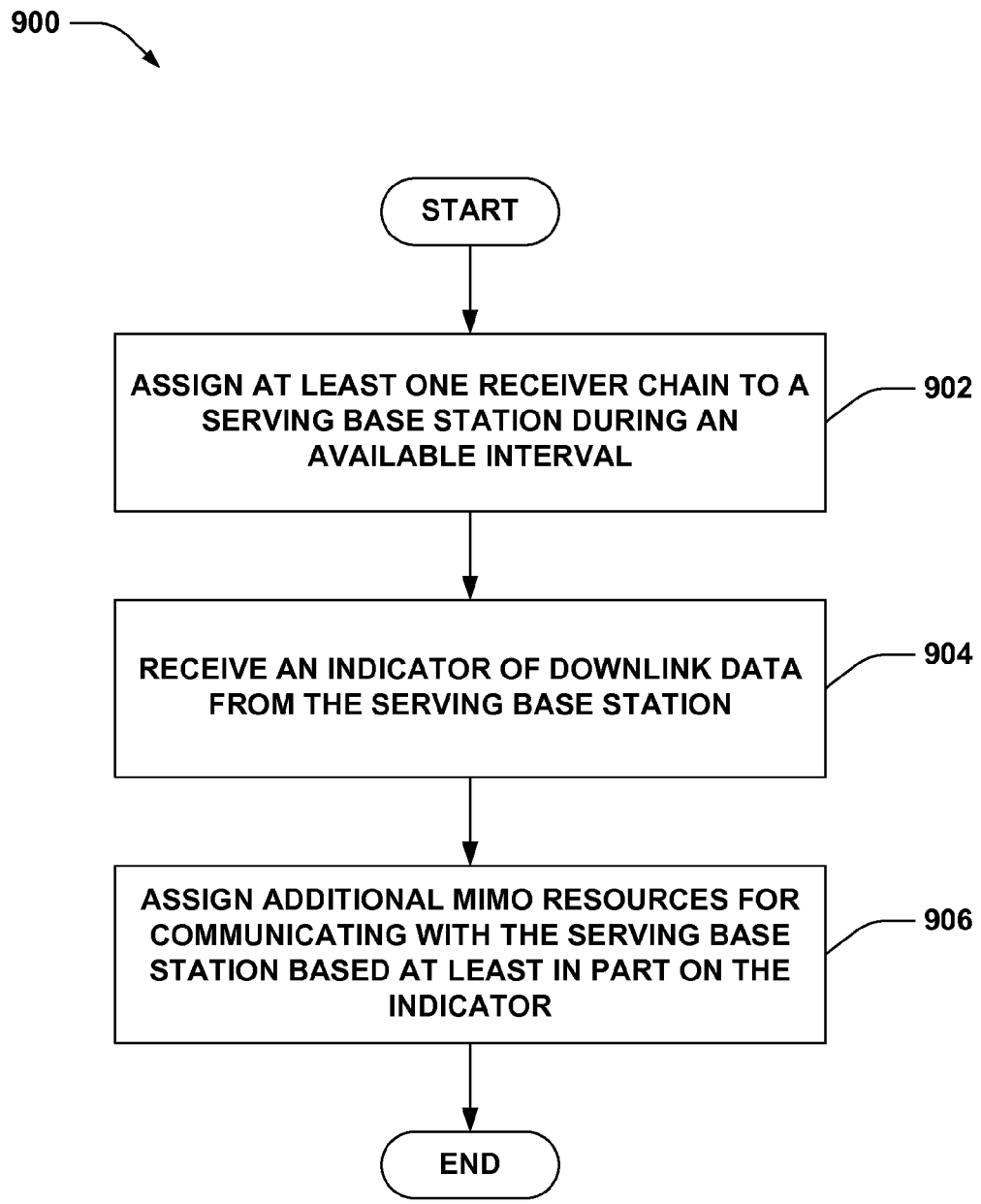
FIG. 9 is a flow chart of an aspect of a methodology for switching MIMO resources for allocation to a serving base station.
Figure 10:
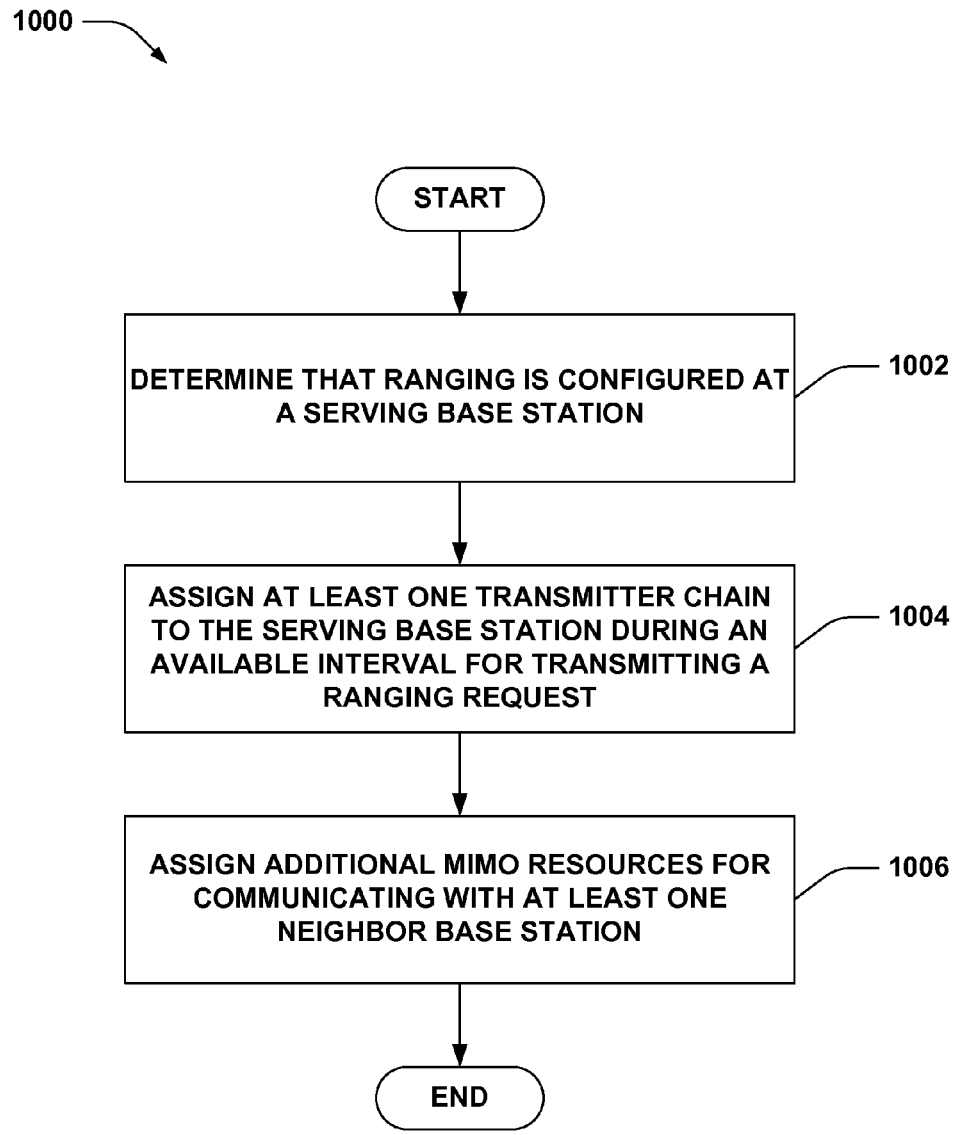
FIG. 10 is a flow chart of an aspect of a methodology for assigning at least a portion of MIMO resources to a serving base station for transmitting ranging requests.

Referring to FIGS. 8-10, example methodologies relating to configuring MIMO resources are illustrated. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 8 illustrates an example methodology 800 for assigning MIMO resources among various base stations.

At 802, a type of a current interval for communicating with a serving base station during a sleep mode can be determined. For example, the current interval can be an interval during which communications are possible from the serving base station (e.g., an available interval in WiMAX), or an interval during which communications are not sent from the serving base station (e.g., an unavailable interval). The current interval type can be determined, as described, based in part on an indication of the start of a given interval from the serving base station, a predefined or configured duration of the interval along with an indication of the start of sleep mode from the serving base station, etc.

At 804, MIMO resources can be assigned between the serving base station and at least one neighbor base station based in part on the type of the current interval. For example, for an available interval, the MIMO resources can be assigned such that at least one receiver chain is used to communicate with the serving base station to possibly receive signals therefrom. In another example, at least one transmitter chain can also be used to send a RNG-REQ to the serving base station. In another example, where the interval is an unavailable interval, all MIMO resources can be assigned to the neighbor base station since communications are not received from the serving base station in the unavailable interval.

FIG. 9 shows an example methodology 900 for switching MIMO resources among base stations.

At 902, at least one receiver chain can be assigned to a serving base station during an available interval. This can include tuning the receiver chain to an operating frequency of the serving base station to receive signals therefrom. Other MIMO resources can be utilized for communicating with other base stations.

At 904, an indication of downlink data can be received from the serving base station. For example, this can include receiving a DL-MAP indicator in a subframe during the available interval. In another example, this can include receiving a TRF-IND or other message that specifies to exit sleep mode.

At 906, additional MIMO resources can be assigned for communicating with the serving base station based at least in part on the indicator. Thus, for example, resources being used to communicate with neighbor base stations can be switched to communicate with the serving base station. In one example, this can include tuning the resources to an operating frequency related to the serving base station to transmit to and/or receive from the serving base station.

FIG. 10 depicts an example methodology 1000 for assigning MIMO resources for ranging requests.

At 1002, it can be determined that ranging is configured at a serving base station. For example, this can be based on one or more configured parameters corresponding to a connection with the base station, and can indicate that ranging is to be used in requesting contention-based resources from the base station.

At 1004, at least one transmitter chain can be assigned to the serving base station during an available interval for transmitting a ranging request. This can include tuning the transmitter chain to an uplink frequency related to the serving base station. In addition, a receiver chain can be assigned to the serving base station for receiving a ranging response.

At 1006, additional MIMO resources can be assigned for communicating with at least one neighbor base station. As described, this can include tuning related receiver and/or transmitter chains for communicating with the at least one neighbor base station. In addition, where a ranging request is transmitted to the serving base station, the at least one transmitter chain can be tuned for communicating with the at least one neighbor base station where a ranging response is received from the serving base station.

It will be appreciated that, in accordance with one or more aspects described herein, inferences can be made regarding determining whether to assign MIMO resources to neighbor base stations, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
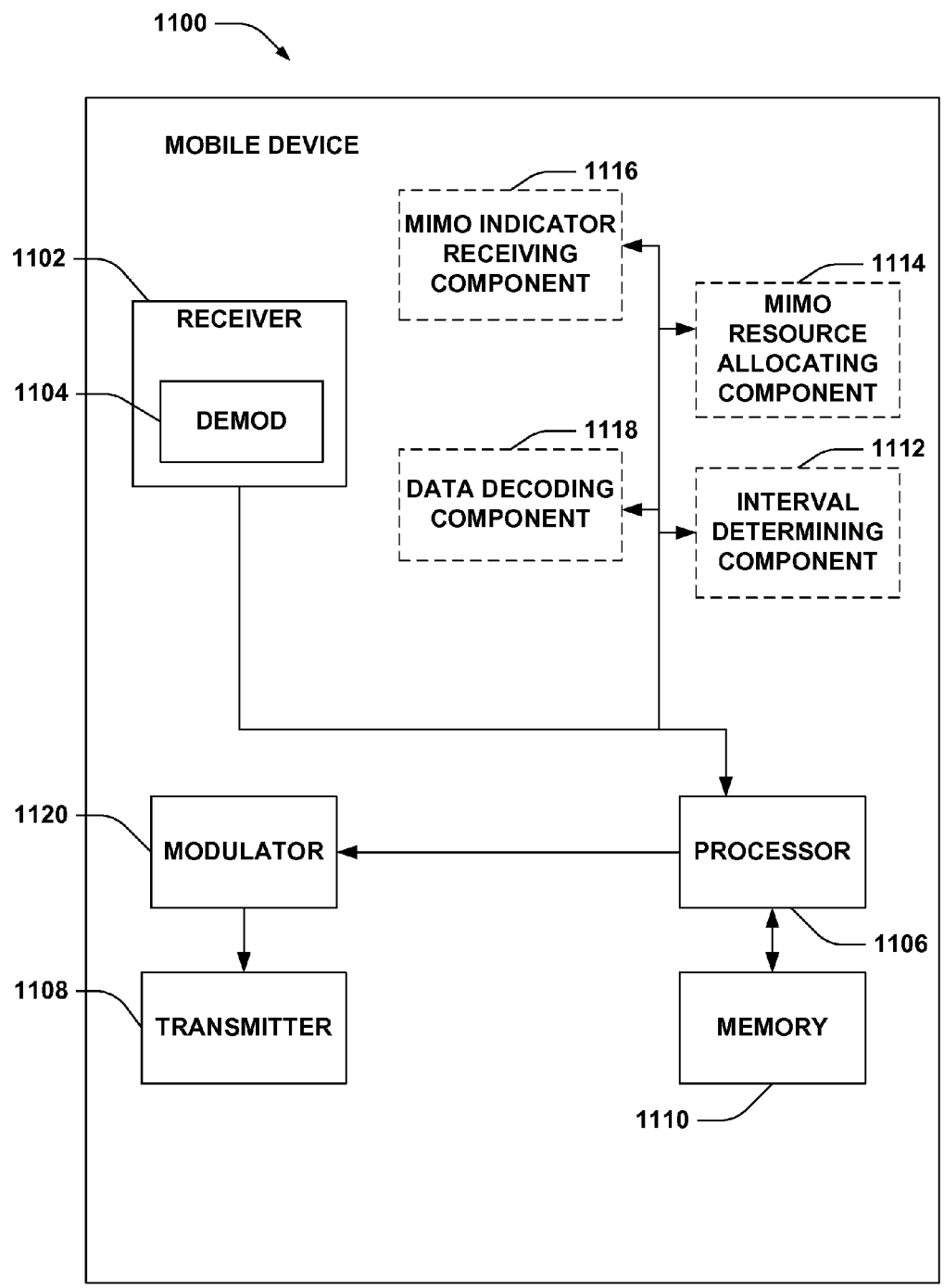
FIG. 11 illustrates a block diagram of an example mobile device in accordance with aspects described herein.

FIG. 11 is an illustration of a mobile device 1100 that facilitates allocating MIMO resources. Mobile device 1100 comprises a receiver 1102 that receives a signal from, for instance, a receive antenna (not shown), performs typical actions on (e.g., filters, amplifies, downconverts, etc.) the received signal, and digitizes the conditioned signal to obtain samples. Receiver 1102 can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1108, a processor that controls one or more components of mobile device 1100, and/or a processor that both analyzes information received by receiver 1102, generates information for transmission by transmitter 1108, and controls one or more components of mobile device 1100.

Mobile device 1100 can additionally comprise memory 1110 that is operatively coupled to processor 1106 and that can store data to be transmitted, received data, information related to available channels, data associated with analyzed signal and/or interference strength, information related to an assigned channel, power, rate, or the like, and any other suitable information for estimating a channel and communicating via the channel. Memory 1110 can additionally store protocols and/or algorithms associated with estimating and/or utilizing a channel (e.g., performance based, capacity based, etc.).

It will be appreciated that the data store (e.g., memory 1110) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1110 of the subject systems and methods is intended to comprise, without being limited to, these and any other suitable types of memory.

Processor 1106 can further be optionally operatively coupled to a interval determining component 1112, which can be similar to interval determining component 508, a MIMO resource allocating component 1114, which can be similar to MIMO resource allocating component 510, a MIMO indicator receiving component 1116, which can be similar to MIMO indicator receiving component 512, and/or a data decoding component 1118, which can be similar to data decoding component 514.

Mobile device 1100 still further comprises a modulator 1120 that modulates signals for transmission by transmitter 1108 to, for instance, a base station, another mobile device, etc. Moreover, for example, mobile device 1100 can comprise multiple transmitters 1108 for multiple network interfaces, as described. Although depicted as being separate from the processor 1106, it is to be appreciated that the interval determining component 1112, MIMO resource allocating component 1114, MIMO indicator receiving component 1116, data decoding component 1118, demodulator 1104, and/or modulator 1120 can be part of the processor 1106 or multiple processors (not shown)), and/or stored as instructions in memory 1110 for execution by processor 1106.

Figure 12:
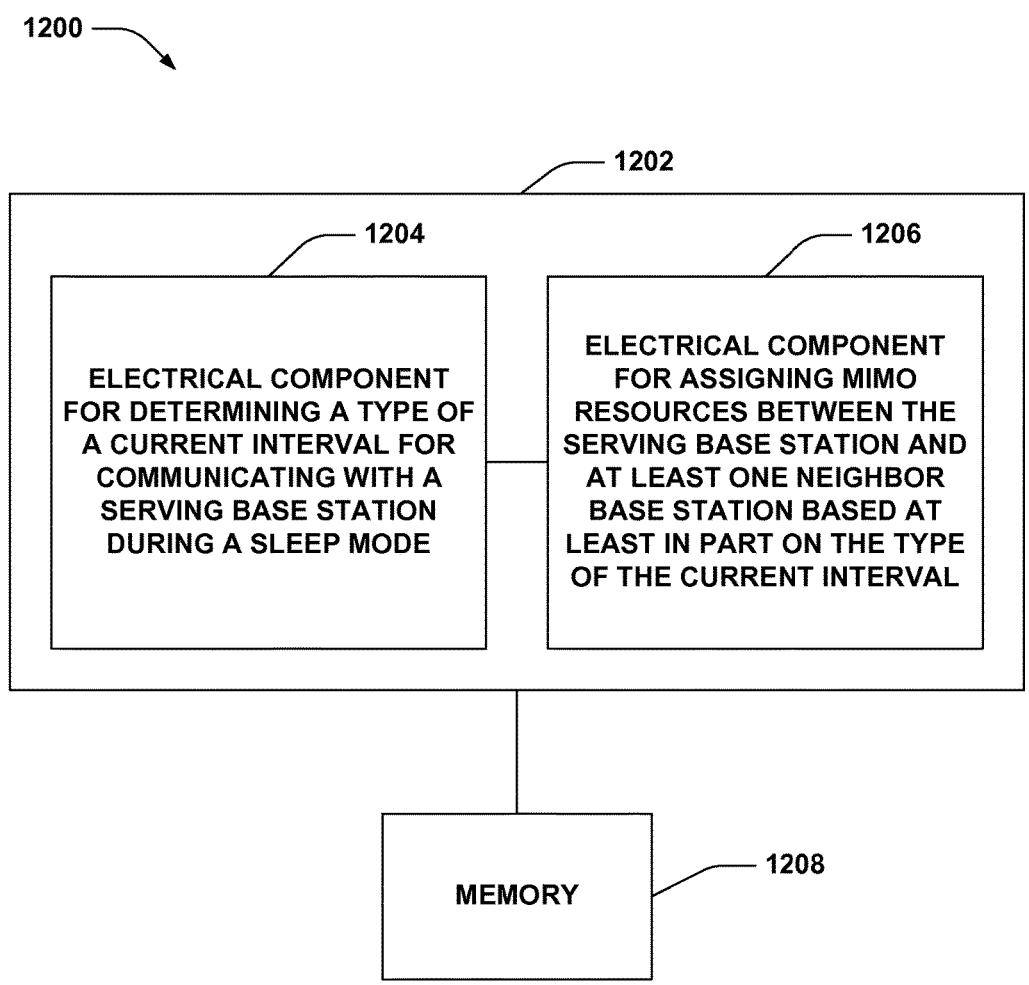
FIG. 12 is a block diagram of an aspect of a system that assigns MIMO resources among multiple base stations.

With reference to FIG. 12, illustrated is a system 1200 that allocates MIMO resources among multiple base stations. For example, system 1200 can reside at least partially within a device. It is to be appreciated that system 1200 is represented as including functional blocks, which can be functional blocks that represent functions implemented by a processor, software, firmware, or combinations thereof. System 1200 includes a logical grouping 1202 of components (e.g., electrical components) that can act in conjunction. For instance, logical grouping 1202 can include an electrical component for determining a type of a current interval for communicating with a serving base station during a sleep mode 1204. This can include receiving an indication of the type of interval, determining the type of interval from one or more predefined or configured parameters, etc., as described.

Further, logical grouping 1202 can comprise an electrical component for assigning MIMO resources between the serving base station and at least one neighbor base station based at least in part on the type of the current interval 1206. For example, in an available interval, at least one receiver chain can be assigned to the serving base station, as described. For example, electrical component 1204 can include an interval determining component 508, as described above. In addition, for example, electrical component 1206, in an aspect, can include a MIMO resource allocating component 510.

Additionally, system 1200 can include a memory 1208 that retains instructions for executing functions associated with the electrical components 1204 and 1206. While shown as being external to memory 1208, it is to be understood that one or more of the electrical components 1204 and 1206 can exist within memory 1208. In one example, electrical components 1204 and 1206 can comprise at least one processor, or each electrical component 1204 and 1206 can be a corresponding module of at least one processor. Moreover, in an additional or alternative example, components 1204 and 1206 can be a computer program product comprising a computer readable medium, where each component 1204 and 1206 can be corresponding code.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for determining multiple-input multiple-output (MIMO) resource allocation, comprising:
    determining, by a processor of a mobile device, a type of a current interval for communicating with a serving base station during a sleep mode, the type of the current interval comprising one or both of an available interval and an unavailable interval within the sleep mode;
    determining that ranging is configured with the serving base station; and
    assigning, by the processor of the mobile device, MIMO resources of the mobile device between the serving base station and at least one neighbor base station based at least in part on the type of the current interval, wherein assigning MIMO resources comprises assigning at least one transmitter chain to the serving base station for transmitting a ranging request, and wherein the MIMO resources comprise a virtual antenna port, or a physical antenna port, or a combination thereof associated with the mobile device.

2. The method of claim 1, further comprising determining that communications from the serving base station are possible based on the type of the current interval, wherein the assigning the MIMO resources comprises assigning at least one receiver chain to the serving base station based in part on the determining that communications are possible.

3. The method of claim 2, wherein the determining that the communications from the serving base station are possible comprises determining that the type of the current interval is the available interval.

4. The method of claim 3, wherein the determining that the communications from the serving base station are possible further comprises determining a traffic triggered wakening flag is set to on.

5. The method of claim 2, further comprising:
receiving an indicator of downlink data from the serving base station in the current interval; and
assigning additional MIMO resources to the serving base station based at least in part on the receiving the indicator.

6. The method of claim 5, wherein the receiving the indicator comprises receiving an allocation for a downlink data burst during the current interval or receiving a traffic indicator for exiting the sleep mode.

7. The method of claim 2, further comprising:
determining a subsequent type of a subsequent interval in the sleep mode is the unavailable interval; and
assigning the at least one receiver chain to the at least one neighbor base station based in part on determining the subsequent type of the subsequent interval is the unavailable interval.

8. The method of claim 1, further comprising assigning the at least one transmitter chain to the at least one neighbor base station upon receiving a response to the ranging request from the serving base station.

9. An apparatus for determining multiple-input multiple-output (MIMO) resource allocation, comprising:
a processor; memory coupled to the processor storing instructions that when executed by the processor, cause the processor to:
determine a type of a current interval for communicating with a serving base station during a sleep mode, the type of the current interval comprising one or both of an available interval and an unavailable interval within the sleep mode;
determine that ranging is configured with the serving base station; and
assign MIMO resources of the apparatus between the serving base station and at least one neighbor base station based at least in part on the type of the current interval, wherein assigning MIMO resources comprises assigning at least one transmitter chain to the serving base station for transmitting a ranging request, and wherein the MIMO resources comprise a virtual antenna port, or a physical antenna port, or a combination thereof associated with the apparatus.

10. The apparatus of claim 9, wherein the instructions are further executable by the processor to determine that communications from the serving base station are possible based on the type of the current interval, and wherein the instructions are further executable by the processor to assign at least one receiver chain of the MIMO resources to the serving base station based in part on the determining that communications are possible.

11. The apparatus of claim 10, wherein the instructions are further executable by the processor to determine that the communications from the serving base station are possible in part by determining that the type of the current interval is the available interval.

12. The apparatus of claim 10, wherein the instructions are further executable by the processor to:
receive an indicator of downlink data from the serving base station in the current interval; and
assign additional MIMO resources to the serving base station based at least in part on the indicator.

13. The apparatus of claim 10, wherein the instructions are further executable by the processor to assign the at least one receiver chain to the at least one neighbor base station in a subsequent interval based in part on determining a subsequent type of the subsequent interval is the unavailable interval.

14. An apparatus for determining multiple-input multiple-output (MIMO) resource allocation, comprising:
means for determining a type of a current interval for communicating with a serving base station during a sleep mode, the type of the current interval comprising one or both of an available interval and an unavailable interval within the sleep mode;
means for determining that ranging is configured with the serving base station; and
means for assigning MIMO resources of the apparatus between the serving base station and at least one neighbor base station based at least in part on the type of the current interval, wherein assigning MIMO resources comprises assigning at least one transmitter chain to the serving base station for transmitting a ranging request, and wherein the MIMO resources comprise a virtual antenna port, or a physical antenna port, or a combination thereof associated with the apparatus.

15. The apparatus of claim 14, wherein the means for assigning determines that communications from the serving base station are possible based on the type of the current interval of the sleep mode and assigns at least one receiver chain of the MIMO resources to the serving base station based in part on the determining that communications are possible.

16. The apparatus of claim 15, wherein the means for assigning determines that the communications from the serving base station are possible based in part on determining that the type of the current interval is the available interval.

17. The apparatus of claim 15, further comprising means for receiving an indicator of downlink data from the serving base station in the current interval, wherein the means for assigning assigns additional MIMO resources to the serving base station based at least in part on the indicator.

18. The apparatus of claim 15, wherein the means for assigning determines a subsequent type of a subsequent interval in the sleep mode is the unavailable interval and assigns the at least one receiver chain to the at least one neighbor base station based in part on determining the subsequent type of the subsequent interval is the unavailable interval.

19. A non-transitory computer-readable medium storing computer-executable code, the code executable by a processor to:
determine a type of a current interval for communicating with a serving base station during a sleep mode, the type of the current interval comprising one or both of an available interval and an unavailable interval within the sleep mode;

determine that ranging is configured with the serving base station; and assign MIMO resources of a mobile device between the serving base station and at least one neighbor base station based at least in part on the type of the current interval, wherein assigning MIMO resources comprises assigning at least one transmitter chain to the serving base station for transmitting a ranging request, and wherein the MIMO resources comprise a virtual antenna port, or a physical antenna port, or a combination thereof associated with the mobile device.

20. The non-transitory computer-readable medium of claim 19, wherein the code is further executable by the processor to determine that communications from the serving base station are possible based on the type of the current interval, and to assign at least one receiver chain of the MIMO resources to the serving base station based in part on the determining that communications are possible.

21. The non-transitory computer-readable medium of claim 20, wherein the code is further executable by the processor to determine that the communications from the serving base station are possible based in part on determining that the type of the current interval is the available interval.

22. The non-transitory computer-readable medium of claim 20, wherein the code is further executable by the processor to:
receive an indicator of downlink data from the serving base station in the current interval; and
assign additional MIMO resources to the serving base station based at least in part on the indicator.

23. The non-transitory computer-readable medium of claim 20, wherein the code is further executable by the processor to assign the at least one receiver chain to the at least one neighbor base station in a subsequent interval based in part on determining a subsequent type of the subsequent interval is the unavailable interval.

24. An apparatus for determining multiple-input multiple-output (MIMO) resource allocation, comprising:
an interval determining component that determines a type of a current interval for communicating with a serving base station during a sleep mode, the type of the current interval comprising one or both of an available interval and an unavailable interval within the sleep mode; and
a MIMO resource allocating component that assigns MIMO resources of the apparatus between the serving base station and at least one neighbor base station based at least in part on the type of the current interval, wherein assigning MIMO resources comprises determining that ranging is configured with the serving base station and assigning at least one transmitter chain to the serving base station for transmitting a ranging request, and wherein the MIMO resources comprise a virtual antenna port, or a physical antenna port, or a combination thereof associated with the apparatus.

25. The apparatus of claim 24, wherein the MIMO resource allocating component determines that communications from the serving base station are possible based on the type of the current interval and assigns at least one receiver chain if the MIMO resources to the serving base station based in part on the determining that communications are possible.

26. The apparatus of claim 25, wherein the MIMO resource allocating component determines that the communications from the serving base station are possible based in part on determining that the type of the current interval is the available interval.

27. The apparatus of claim 26, wherein the MIMO resource allocating component determines that the communications from the serving base station are possible based further in part on determining a traffic triggered wakening flag is set to on.

28. The apparatus of claim 25, further comprising a MIMO indicator receiving component that receives an indicator of downlink data from the serving base station in the current interval, wherein the MIMO resource allocating component assigns additional MIMO resources to the serving base station based at least in part on the indicator.

29. The apparatus of claim 28, wherein the MIMO indicator receiving component receives an allocation for a downlink data burst during the current interval or receiving a traffic indicator for exiting the sleep mode.

30. The apparatus of claim 25, wherein the MIMO resource allocating component determines a subsequent type of a subsequent interval in the sleep mode is the unavailable interval and assigns the at least one receiver chain to the at least one neighbor base station based in part on determining the subsequent type of the subsequent interval is the unavailable interval.

31. The apparatus of claim 24, wherein the MIMO resource allocating component assigns the at least one transmitter chain to the at least one neighbor base station upon receiving a response to the ranging request from the serving base station.

32. The method of claim 3, further comprising:
assigning, by the processor, MIMO resources to the at least one neighbor base station during the available interval.

33. The method of claim 32, further comprising:
reassigning the assigned MIMO resources to the serving base station when there is traffic destined from the serving base station.

* * * * *